Oct. 14, 1930.    S. FREEBURG    1,778,150

FLOWERPOT

Filed Dec. 15, 1927

STURE FREEBURG
INVENTOR

PER
Albert J. Fihe
ATTORNEY

Patented Oct. 14, 1930

1,778,150

UNITED STATES PATENT OFFICE

STURE FREEBURG, OF CHICAGO, ILLINOIS

FLOWERPOT

Application filed December 15, 1927. Serial No. 240,197.

This invention relates to improvements in flower pots, and has for one of its principal objects the provision of a flower pot whereby water may be placed in the pot so that it enters the earth in which the plant, contained within the pot, is placed at a point below the surface of the earth, and accordingly the water enters the interior of the plant, and is therefore more readily absorbed, at the same time eliminating the humidity of the surface of the soil in the pot and preventing any liability of spilling or overflow.

A further object of the invention is to provide a flower pot of this character wherein the bottom of the earth supporting pot is spaced above the actual support whereby the air will have free access to the pot bottom when the water in the pot has been absorbed or evaporated.

Another object of the invention is the provision in a flower pot of a material which will not react in any way, even in the presence of moisture, with the soil in which the flower is planted, thereby simulating as closely as possible actual outdoor growth conditions.

Other and further important objects of the invention will be apparent from the disclosures in the accompanying drawings and following specification.

The invention, in a preferred form, is illustrated in the drawings and hereinafter more fully described.

Figures 1, 2:
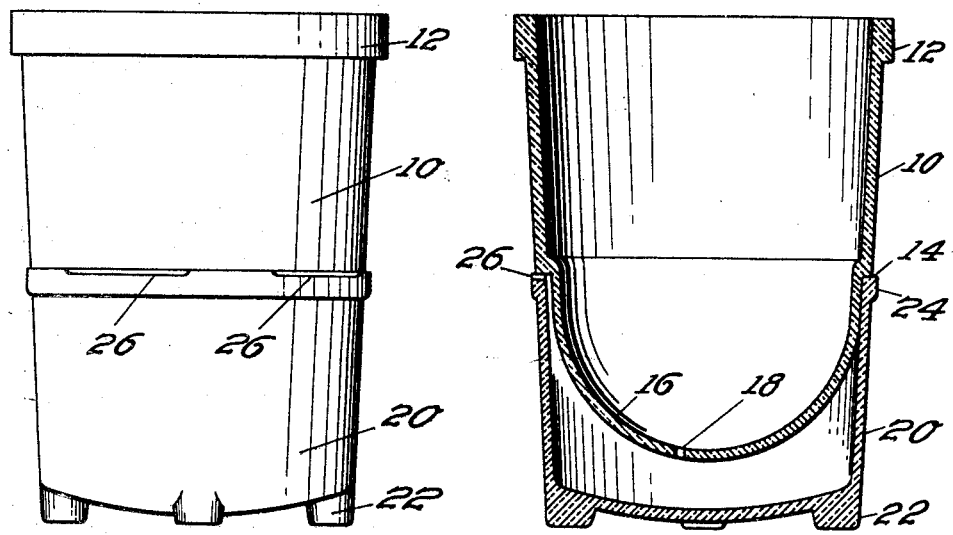
Figure 1 is a side elevation of the improved flower pot of this invention.
Figure 2 is a sectional view of the same.
Figures 3, 4:
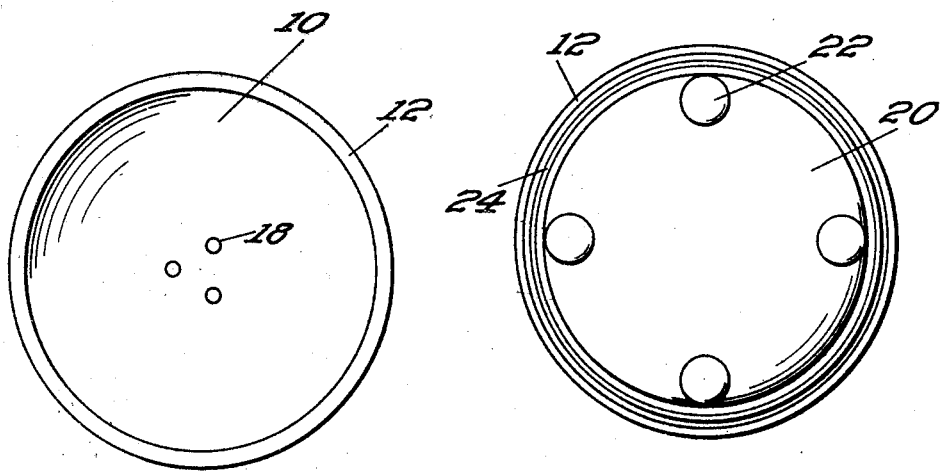
Figure 3 is a top plan view of the pot showing the interior construction.
Figure 4 is a bottom view of the pot showing particularly the support.

The reference numeral 10 indicates generally a flower pot construction which may be of any desired shape or size, but which is preferably somewhat cylindrical as shown, and provided with an upper rim or the like 12 integral with the material of the pot. An annular shoulder 14 is formed exteriorly of the pot approximately two-fifths of the height thereof, and below this shoulder the pot is preferably formed in a semi-spherical shape as best shown at 16 in Figure 2. A plurality of openings 18 are formed in the lower end of this semispherical bottom which will allow of the ready entrance of water and air to the interior of the pot and to the soil contained therein.

A supporting face 20 is provided for the upper portion 10 of the pot, this supporting face comprising essentially a removable receptacle for water or the like preferably cylindrical in shape and formed with suitable legs or supports 22. The upper edge of this receptacle 20 is provided with an annular rim 24 which has depressions 26 formed therein as shown in Figure 1, and it will be noted that the diameter of the upper edge of the receptacle 20 is slightly greater than the outer diameter of the corresponding upper edge of the semispherical portion of the member 10. In this manner, a space is provided for the ingress and egress of air whereby proper ventilation of the interior of the pot is assured.

The material, of which the entire device is composed, is preferably a phenol condensation product which, being impervious to water and acids, forms an absolutely neutral body so far as the earth or the soil, in which the growing plant is imbedded, is concerned, and which even in the presence of water will not react in any way with the constituents of the soil, thereby eliminating the deleterious effects which have heretofore often been noticed in potted plants. Further, the fact that water may be placed in the receptacle 20 and then allowed to penetrate to the interior of the pot through the openings 18 eliminates the disagreeable features which have heretofore been considered necessary evils in the maintenance of potted plants. Further, proper ventilation of the interior of the pot and of the roots of the plant is assured after the water has subsided below the lowermost point of the semispherical portion 16 of the pot 10 while at the same time the evaporation of the water continues to supply moisture to the roots of the plant.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A flower pot composed of a phenol condensation product, and comprising an upper and a lower portion, the upper portion comprising a cylindrical container, a semispherical base integrally formed with said cylindrical container, and a lower cylindrical receptacle for the reception of said semispherical portion provided with openings for the entrance of water thereto from the lower receptacle, the upper edge of the lower receptacle being formed with depressions to allow the ventilation of the spaces between the upper and lower receptacles.

2. A flower pot comprising an upper and a lower portion, the upper portion comprising a cylindrical container, a semispherical base integrally formed with said cylindrical container, and a lower cylindrical receptacle for the reception of said semispherical portion provided with openings for the entrance of water thereto from the lower receptacle, the upper edge of the lower receptacle being formed with depressions to allow the ventilation of the spaces between the upper and lower receptacles, and an annular shoulder formed on the upper receptacle at the line of juncture of the receptacles.

3. A flower pot comprising an upper and a lower portion, the upper portion comprising a cylindrical container, a semispherical base integrally formed with said cylindrical container, and a lower cylindrical receptacle for the reception of said semispherical portion provided with openings for the entrance of water thereto from the lower receptacle, the upper edge of the lower receptacle being formed with depressions to allow the ventilation of the space between the upper and lower receptacles, and an annular shoulder formed on the upper receptacle at the line of juncture of the receptacles, the exterior diameter of the shoulder being greater than the interior diameter of the upper edge of the lower receptacle.

In testimony whereof I affix my signature.

STURE FREEBURG.